United States Patent
Namba

(10) Patent No.: US 12,065,175 B2
(45) Date of Patent: Aug. 20, 2024

(54) AUTOMATIC DRIVING CONTROL APPARATUS FOR VEHICLE

(71) Applicant: SUBARU CORPORATION, Tokyo (JP)

(72) Inventor: Ryosuke Namba, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 424 days.

(21) Appl. No.: 16/890,766

(22) Filed: Jun. 2, 2020

(65) Prior Publication Data

US 2021/0053590 A1     Feb. 25, 2021

(30) Foreign Application Priority Data

Aug. 20, 2019 (JP) .................. 2019-150531

(51) Int. Cl.
    *B60W 60/00*     (2020.01)
    *B60W 30/06*     (2006.01)
    *B60W 40/08*     (2012.01)

(52) U.S. Cl.
    CPC ........ *B60W 60/0051* (2020.02); *B60W 30/06* (2013.01); *B60W 40/08* (2013.01);
    (Continued)

(58) Field of Classification Search
CPC ........... B60N 2/002; B60N 2002/0272; B60W 30/06; B60W 40/08; B60W 50/082; B60W 50/085; B60W 60/0051; B60W 60/0053; B60W 2040/0881; B60W 2510/202; B60W 2520/105; B60W 2530/18; B60W 2540/10; B60W 2540/12; B60W 2540/18
See application file for complete search history.

(56) References Cited

U.S. PATENT DOCUMENTS 10,493,997 B2 * 12/2019 Kim ...................... G05D 1/0061
2016/0107655 A1 * 4/2016 Desnoyer ............ B60W 50/082
                                                                   701/23

(Continued)

FOREIGN PATENT DOCUMENTS

JP     2008-097413 A     4/2008
JP     2016-115356 A     6/2016

(Continued)

OTHER PUBLICATIONS

Japanese Notice of Reasons for Refusal issued in corresponding Japanese Patent Application No. 2019-150531, dated Apr. 18, 2023, with English translation.

*Primary Examiner* — Peter D Nolan
*Assistant Examiner* — Ce Li Li
(74) *Attorney, Agent, or Firm* — Rimon P.C.

(57) ABSTRACT

An automatic driving control apparatus for a vehicle is capable of switching a driving mode between a manual driving mode in which a driver manually performs a driving operation of the vehicle and an automatic driving mode in which a driving operation is automatically performed along a set target traveling route. The automatic driving control apparatus includes a driving mode switching unit configured to monitor a manual operation by the driver during traveling in the manual driving mode, and to control so as to switch the driving mode to the automatic driving mode after traveling a set range by manual driving.

7 Claims, 4 Drawing Sheets

(52) U.S. Cl.
CPC ............... *B60W 2040/0881* (2013.01); *B60W 2510/202* (2013.01); *B60W 2540/10* (2013.01); *B60W 2540/12* (2013.01)

(56) References Cited

U.S. PATENT DOCUMENTS

| | | | |
|---|---|---|---|
| 2016/0121907 A1* | 5/2016 | Otake | B60W 10/20 |
| | | | 701/23 |
| 2017/0106876 A1* | 4/2017 | Gordon | B60W 50/082 |
| 2017/0261983 A1 | 9/2017 | Abe et al. | |
| 2017/0334451 A1 | 11/2017 | Asakura et al. | |
| 2017/0334452 A1* | 11/2017 | Abe | G05D 1/0088 |
| 2017/0364070 A1* | 12/2017 | Oba | B60W 50/08 |
| 2018/0105184 A1* | 4/2018 | Urano | G05D 1/0061 |
| 2019/0110729 A1* | 4/2019 | Yamataka | A61B 5/1495 |
| 2019/0217796 A1* | 7/2019 | Takamatsu | B60N 2/0284 |
| 2019/0300053 A1* | 10/2019 | Mizoguchi | B60W 30/18163 |
| 2020/0139992 A1* | 5/2020 | Oba | G08G 1/16 |
| 2020/0231182 A1* | 7/2020 | Oba | B60W 40/09 |
| 2021/0061312 A1* | 3/2021 | Wang | B60W 50/14 |
| 2021/0080949 A1* | 3/2021 | Takeda | B62D 1/06 |
| 2021/0286357 A1* | 9/2021 | Oba | B60W 60/0051 |
| 2022/0194433 A1* | 6/2022 | Nagata | B60W 60/0013 |

FOREIGN PATENT DOCUMENTS

| | | |
|---|---|---|
| JP | 2017-019424 A | 1/2017 |
| JP | 2017-165157 A | 9/2017 |
| JP | 2017-207859 A | 11/2017 |

\* cited by examiner

AUTOMATIC DRIVING CONTROL APPARATUS FOR VEHICLE

CROSS REFERENCE TO RELATED APPLICATIONS

This application claims priority from Japanese Application No. 2019-150531 filed in Japan on Aug. 20, 2019, the entire contents of which are hereby incorporated by reference.

BACKGROUND

The technology relates to an automatic driving control apparatus for a vehicle, and more particularly to an automatic driving control apparatus for a vehicle capable of switching between manual driving and automatic driving.

In recent years, various techniques for realizing driving assist and automatic driving of a vehicle have been developed. In the driving assist of a vehicle, steering operation and/or acceleration/deceleration of the vehicle is supported while a driver holds the steering wheel. In the automatic driving of a vehicle, operations related to the driving of the vehicle are performed by recognizing traffic conditions only in a specific place even when a driver releases the steering wheel.

The automatic driving of the vehicle includes: a case where, even when limited to the specific place, the driver responds to an emergency when a system becomes difficult to operate; a case where the system responds even in an emergency; a case where the system performs the operations related to the driving of the vehicle without limitation of the place, and the like.

An automatic driving control apparatus for a vehicle that performs such automatic driving is disclosed, for example, in Japanese Unexamined Patent Application Publication (JP-A) No. 2016-115356. JP-A No. 2016-115356 discloses a technique in which an automatic driving control apparatus prohibits automatic driving when a return judgment unit judges that a driver has no driving capability, before starting automatic driving of a vehicle.

SUMMARY

An aspect of the technology provides an automatic driving control apparatus for a vehicle. The automatic driving control apparatus is capable of switching a driving mode between a manual driving mode in which a driver manually performs a driving operation of the vehicle and an automatic driving mode in which a driving operation is automatically performed along a set target traveling route. The automatic driving control apparatus includes a driving mode switching unit configured to monitor a manual operation by the driver during traveling in the manual driving mode, and to control so as to switch the driving mode to the automatic driving mode after traveling a set range by manual driving.

An automatic driving control apparatus for a vehicle according to another aspect of the technology is an automatic driving control apparatus for a vehicle switchable between a manual driving mode in which a driver manually performs a driving operation of an own vehicle and an automatic driving mode in which a driving operation is automatically performed along a set target traveling route, and includes a processor configured to monitor a manual operation by the driver during traveling in the manual driving mode, and to control so as to be switchable from the manual driving mode to the automatic driving mode after traveling a set range by manual driving.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Figure 1:
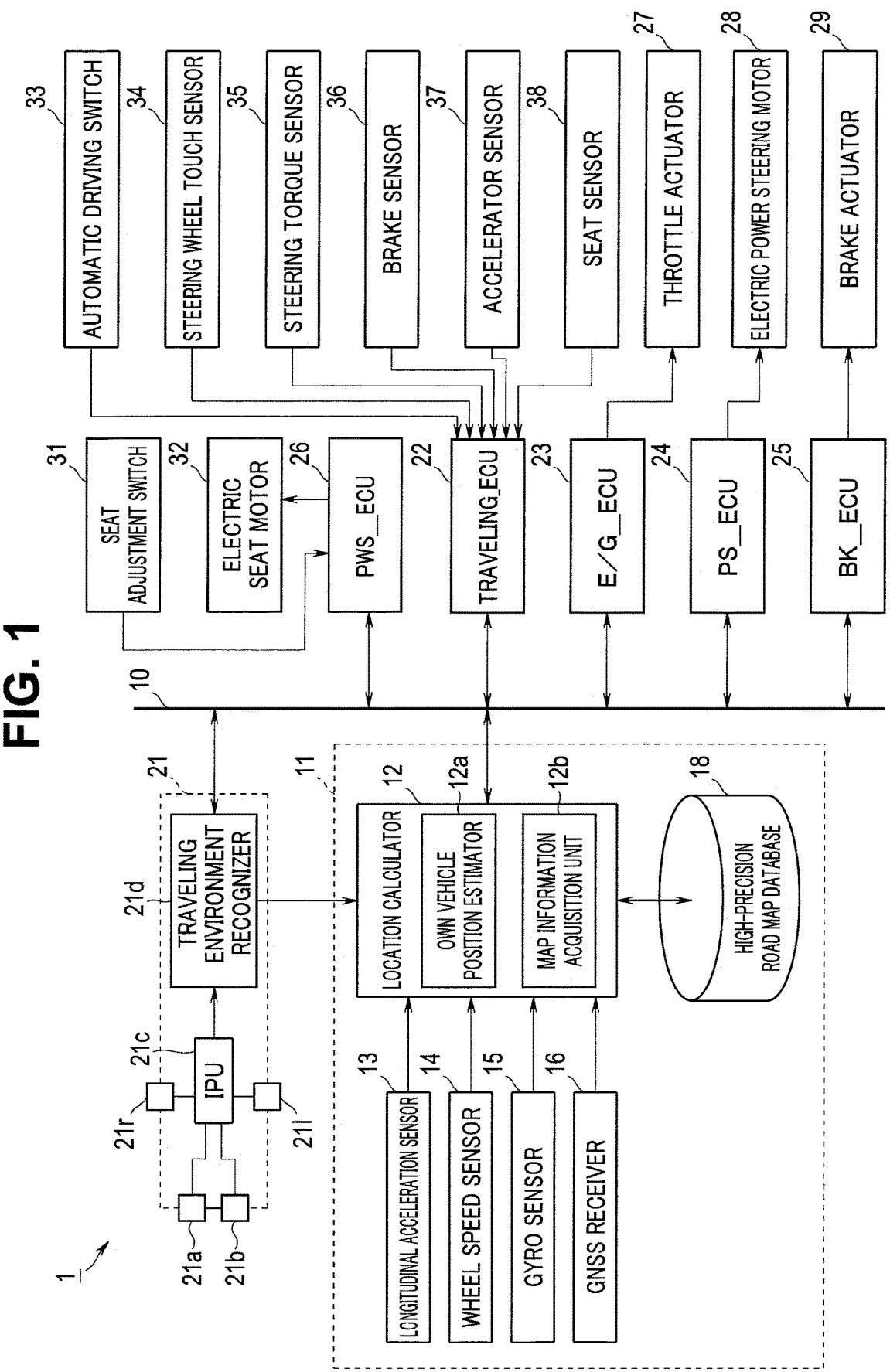
FIG. 1 is a schematic configuration diagram of an automatic driving control apparatus for a vehicle.

During automatic driving of a vehicle, a driver does not have to hold a steering wheel, does not have to operate an accelerator and a brake, and does not need to constantly monitor surroundings. Therefore, in order to take a relaxed posture, the driver may move a seat backward and recline a backrest of the seat, resulting in a seat position that is unsuitable for driving operation.

In a case where the automatic driving of the vehicle is executed in such a state, when the driver is requested to take over the vehicle operation at the time of switching to the manual driving, the driver may not be able to perform an appropriate driving operation despite the intention to perform the driving operation.

In view of such circumstances, it is desirable to provide an automatic driving control apparatus for a vehicle that executes an automatic driving function of the vehicle by judging whether a driver can perform an appropriate driving operation.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

In the drawings used in the following description, in order to make each component recognizable in the drawings, the scale is different for each component, and the technology is not limited only to the number of components, the shapes of the components, the ratios of the sizes of the components, and the relative positional relationships of the components described in these drawings.

A driving assist apparatus 1 including an automatic driving control apparatus for a vehicle illustrated in FIG. 1 is mounted on a vehicle (own vehicle) such as an automobile. The driving assist apparatus 1 includes a locator unit 11 and a camera unit 21 as a sensor unit (that serves as a traveling environment recognizer) for recognizing a traveling environment outside the vehicle, and both the units 11 and 21 constitute completely independent multiplex systems independent of each other. Further, the driving assist apparatus 1 includes a traveling control unit (hereinafter referred to as "traveling_ECU") 22 including a circuit/processor, an engine control unit (hereinafter referred to as "E/G_ECU") 23, a power steering control unit (hereinafter referred to as "PS_ECU") 24, a brake control unit (hereinafter referred to as "BK_ECU") 25, and a power seat control unit (hereinafter referred to as "PWS_ECU") 26, and these control units 22 to 26 are coupled together to the locator unit 11 and the camera unit 21 via an in-vehicle communication line 10 such as a CAN (Controller Area Network).

The locator unit 11 is for estimating an own vehicle position on a road map, and has a location calculator 12 for estimating a position of the own vehicle. Sensors necessary for estimating the position of the own vehicle (own vehicle position) are coupled to an input side of the location calculator 12. The sensors include a longitudinal acceleration sensor 13 which detects longitudinal acceleration of the own vehicle, a wheel speed sensor 14 which detects rotation speeds of the front left, front right, rear left and rear right wheels, a gyro sensor 15 which detects an angular velocity or an angular acceleration of the own vehicle, a GNSS receiver 16 which receives positioning signals transmitted from a plurality of positioning satellites, and the like.

Further, a high-precision road map database 18 that serves as a storage unit is coupled to the location calculator 12. The high-precision road map database 18 is a large-capacity storage medium such as an HDD, and stores high-precision road map information (dynamic map). The high-precision road map information has lane width data, lane center position coordinates data, lane traveling azimuth angle data, speed limit, and the like as lane data required for automatic driving. The lane data is stored every several meters for each lane on the road map.

The location calculator 12 includes an own vehicle position estimator 12a that estimates the position of the own vehicle, and a map information acquisition unit 12b. The map information acquisition unit 12b acquires route map information from a current location to a destination from the map information stored in the high-precision road map database 18, for example, based on the destination set by the driver for the automatic driving.

Further, the map information acquisition unit 12b transmits the acquired route map information (lane data on the route map) to the own vehicle position estimator 12a. The own vehicle position estimator 12a acquires position coordinates of the own vehicle based on the positioning signals received by the GNSS receiver 16. Further, the own vehicle position estimator 12a performs map matching of the acquired position coordinates on the route map information, estimates the own vehicle position on the road map, identifies the traveling lane, and acquires the road curvature at the center of the traveling lane stored in the road map data.

Furthermore, in an environment in which it is impossible to receive valid positioning signals from the positioning satellites due to a decrease in sensitivity of the GNSS receiver 16, such as traveling in a tunnel, the own vehicle position estimator 12a switches to autonomous navigation in which the own vehicle position is estimated based on a vehicle speed obtained based on a wheel speed detected by the wheel speed sensor 14, an angular speed detected by the gyro sensor 15, and a longitudinal acceleration detected by the longitudinal acceleration sensor 13, and estimates the own vehicle position on the road map.

The camera unit 21 is fixed to an upper center of a front portion of a cabin, and includes an on-vehicle camera (stereo camera) configured with a main camera 21a and a sub camera 21b disposed symmetrically with respect to a center in a vehicle width direction, an image processing unit (IPU) 21c, and a traveling environment recognizer 21d.

The IPU 21c performs predetermined image processing on forward traveling environment image information ahead of the own vehicle captured by both the cameras 21a and 21b, and generates forward traveling environment image information (distance image information) including distance information obtained from a deviation amount of a corresponding target position.

Based on the distance image information and the like received from the IPU 21c, the traveling environment recognizer 21d obtains road curvatures [1/m] of lane markers that define right and left of a traveling path in which the own vehicle travels (own vehicle traveling path), and a width between the right and left lane markers (road width). Various methods are known for obtaining the road curvature and the road width. For example, the traveling environment recognizer 21d recognizes the right and left lane markers by the binarization processing according to the luminance difference based on the forward traveling environment image information, calculates the curvatures of the right and left lane markers for each predetermined section by using the curve approximation equation by the least squares method or the like, and further calculates the road width from the difference in curvatures between both the lane markers.

Then, the traveling environment recognizer 21d obtains the road curvature at the center of the lane based on the curvatures of the right and left lane markers and the lane width, and further calculates a lateral position deviation of the own vehicle with reference to the lane center, and more precisely, an own vehicle lateral position deviation Xdiff which is a distance from the lane center to the center of the own vehicle in the vehicle width direction.

In addition, the traveling environment recognizer 21d performs predetermined pattern matching or the like for the distance image information to recognize guardrails, curbs, and three dimensional objects that are present along the road. Here, in the recognition of the three dimensional object by the traveling environment recognizer 21d, recognition of, for example, the type of the three dimensional object, the distance to the three dimensional object, the speed of the three dimensional object, the relative speed between the three dimensional object and the own vehicle, and the like is performed.

Further, the camera unit 21 includes side rear cameras 21r and 21l for capturing the right and left rear sides of the own vehicle. When the side traveling environment image information of the own vehicle captured by the side rear cameras 21r and 21l is input to the IPU 21c, the IPU 21c performs a predetermined image processing such as edge detection. Further, the traveling environment recognizer 21d performs predetermined pattern matching or the like on the edge information detected by the IPU 21c, and recognizes a three dimensional object such as a vehicle traveling side by side that is on a side of the own vehicle, a following vehicle that is on a rear side of the own vehicle, or the like.

The own vehicle position estimated by the own vehicle position estimator 12a of the location calculator 12, the own vehicle lateral position deviation Xdiff obtained by the traveling environment recognizer 21d of the camera unit 21, the three dimensional object information, and the like are loaded by the traveling_ECU 22. Further, to an input side of the traveling_ECU 22, as various switches and sensors, an automatic driving switch 33 for the driver 100 (see FIG. 3) to turn on/off the automatic driving (driving assist control), a steering wheel touch sensor 34 that is turned on when the driver 100 holds the steering wheel 42 (see FIG. 3), a steering torque sensor 35 that detects steering torque as a driving operation amount by the driver 100, a brake sensor 36 that detects an amount of depression of a brake pedal 43 (see FIG. 3) as a driving operation amount by the driver 100, an accelerator sensor 37 that detects an amount of depression of an accelerator pedal 44 (see FIG. 3) as a driving operation amount by the driver 100, and a seat sensor 38 that detects a sitting state of the driver 100 in a driver seat 40 (see FIG. 3) are coupled.

In a case where the current driving mode is a second driving assist mode to be described later, the traveling_ECU 22 determines that the mode should be shifted to an automatic evacuation mode when system conditions are not satisfied on an assumption that the automatic driving switch 33 is maintained in an on state.

A throttle actuator 27 is coupled to an output side of the E/G_ECU 23. The throttle actuator 27 opens and closes a throttle valve of an electronically controlled throttle provided in a throttle body of an engine, and generates a desired engine output by opening and closing the throttle valve and adjusting the intake air flow rate by a drive signal from the E/G_ECU 23.

An electric power steering motor 28 is coupled to an output side of the PS_ECU 24. The electric power steering motor 28 applies steering torque to a steering mechanism by a rotational force of a motor. In the automatic driving, by controlling the electric power steering motor 28 by the drive signal from the PS_ECU 24, the active lane keep control for keeping the traveling in the current traveling lane and the lane change control for moving the own vehicle to an adjacent lane (lane change control for overtaking control or the like) are executed.

A brake actuator 29 is coupled to an output side of the BK_ECU 25. The brake actuator 29 adjusts a brake hydraulic pressure to be supplied to a brake wheel cylinder provided to each wheel. When the brake actuator 29 is driven by a drive signal from the BK_ECU 25, the brake actuator 29 causes the brake wheel cylinder to generate a brake force for each wheel, thereby being forced to slow down.

The PWS_ECU 26 has an input side coupled to a seat adjustment switch 31 and an output side coupled to an electric seat motor 32. The seat adjustment switch 31 is provided in a driver seat 40 and is operated by the driver 100 to adjust a desired seat position. The PWS_ECU 26 loads seat position information operated by the driver in an internal memory. Note that the seat position information may be stored in a memory in the traveling_ECU 22.

Then, the PWS_ECU 26 controls and drives the electric seat motor 32 based on a signal from the seat adjustment switch 31, thereby moving the seat back and forth and reclining the backrest. Note that the electric seat motor 32 is configured by a plurality of motors for moving the seat back and forth, and reclining the backrest.

In the traveling_ECU 22, the manual driving mode, a first driving assist mode, the second driving assist mode, and the evacuation mode are set as the driving modes.

Here, the manual driving mode is a steering holding-required driving mode that requires steering holding by the driver 100, and is a driving mode, for example, in which the own vehicle is driven in accordance with driving operations such as a steering wheel operation, an accelerator operation, a brake operation, and the like by the driver 100.

Similarly, the first driving assist mode is a steering holding-required driving mode that requires steering holding by the driver 100. That is, the first driving assist mode is a so-called semi-automatic driving mode in which the own vehicle is caused to travel along the target traveling route by mainly performing in combination of the Adaptive Cruise Control, the Lane Keep Assist Control, and the Lane Departure Prevention Control through the control of the E/G_ECU 23, the PS_ECU 24, the BK_ECU 25, and the like, while reflecting the driving operation by the driver 100.

The second driving assist mode is an automatic driving mode in which the own vehicle is caused to travel along the target traveling route by mainly performing in combination of the Adaptive Cruise Control, the Lane Keep Assist Control, and the Lane Departure Prevention Control through the control of the E/G_ECU 23, the PS_ECU 24, the BK_ECU 25, and the like, without requiring steering holding, acceleration operation, and brake operation by the driver 100.

The evacuation mode is a mode for automatically stopping the own vehicle in a side strip or the like in a case where, for example, while the vehicle is traveling in the second driving assist mode, the traveling in the second driving assist mode cannot be continued and the driver cannot take over the driving operation (that is, a case where the driving mode cannot be shifted to the manual driving mode or the first driving assist mode).

Each of the driving modes set in this way is selectively switchable in the traveling_ECU 22. In one embodiment, the traveling_ECU 22 serves as a "driving mode switching unit".

Here, a description will be given of an example of a control executed when the driver 100 switches from the manual driving mode to the second driving assist mode (hereinafter referred to as an automatic driving mode) by the operation of the automatic driving switch 33.

Figure 2:
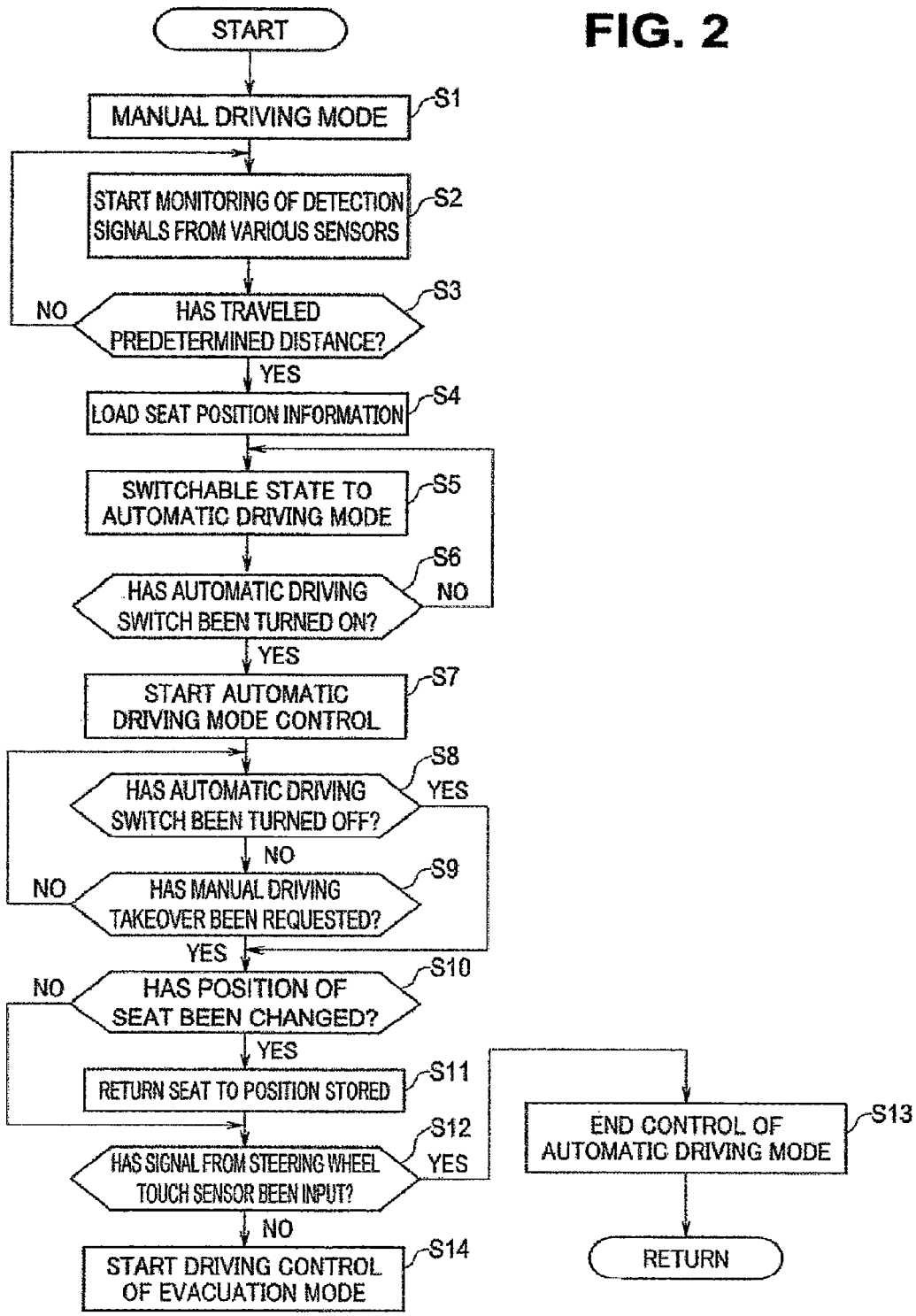
FIG. 2 is a control flowchart for switching from a manual driving mode to an automatic driving mode.

As illustrated in a flowchart in FIG. 2, when the engine of the own vehicle is started, the driving assist apparatus 1 including the automatic driving control apparatus of the own vehicle is started from the manual driving mode by the traveling_ECU 22 (S1).

Then, the traveling_ECU 22 starts monitoring of the input detection signals of the longitudinal acceleration sensor 13, the wheel speed sensor 14, the gyro sensor 15, the steering wheel touch sensor 34, the steering torque sensor 35, the brake sensor 36, the accelerator sensor 37, and the seat sensor 38 (S2). Note that these sensors may be collectively referred to as various sensors for convenience of description.

Next, the traveling_ECU 22 determines, by the locator unit 11, whether the own vehicle has traveled a set distance (a set range which is a distance enough to judge that the manual operation is being performed by the driver 100) as a predetermined distance of approximately several hundreds meters to less than 1 km (S3). Note that the traveling_ECU 22 detects the sitting state of the driver 100 in the driver seat 40 by the seat sensor 38 in step S2 during the set distance in step S3, and monitors a state of the manual driving performed by the driver 100 from the detection signals from the various sensors. That is, steps S2 to S3 are repeated until the own vehicle travels the set distance.

Figure 3:
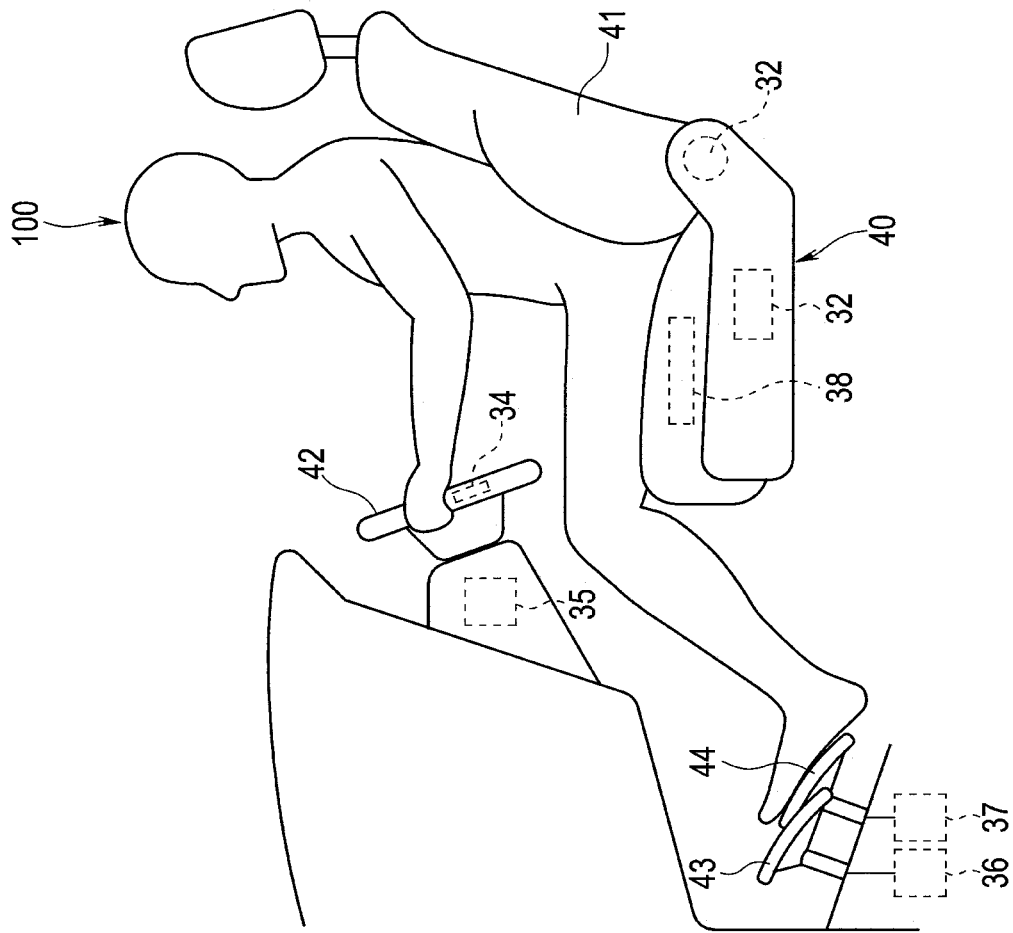
FIG. 3 is a diagram illustrating a seat position in a predetermined posture of a driver during manual driving.

When the own vehicle travels the set distance, the traveling_ECU 22 stores the seat position information of the driver 100 (S4). Here, the traveling_ECU 22 loads and stores the seat position information of the driver seat 40 stored in the internal memory of the PWS_ECU 26. At this time, as illustrated in FIG. 3, the driver 100 is in a state of performing the manual driving at a predetermined seat position and a predetermined posture of the driver seat 40.

Then, the mode becomes switchable state to the automatic driving mode by the traveling_ECU 22 (S5). The switchable state to the automatic driving mode is in a standby state until the driver 100 operates the automatic driving switch 33 in step S6. When the automatic driving switch 33 is turned on (here, the second driving assist mode), the traveling_ECU 22 starts the automatic driving mode control along the target traveling route preset by the driver 100 (S7).

The traveling_ECU 22 executes the automatic driving mode control until the driver 100 turns off the automatic driving switch 33 in step S8. Turning off the automatic driving switch 33 here means that the driver 100 switches to the manual driving mode, but may switch to the first driving assist mode.

Further, the automatic driving mode control is executed until the traveling_ECU 22 in step S9 judges that the traveling in the automatic driving mode cannot be continued and the manual driving takeover is requested.

When the automatic driving switch 33 is turned off or it is judged that the traveling in the automatic driving mode cannot be continued, the traveling_ECU 22 determines whether the position of the driver seat 40 is changed (S10). Here, when the driver 100 operates the seat adjustment switch 31 to control and drive the electric seat motor 32 during the automatic driving mode, the traveling_ECU 22 loads the seat position information from the PWS_ECU 26, stores the seat position information, and detects a change state of the driver seat 40.

When the seat position of the driver seat 40 has been changed, the driver seat 40 is returned to the seat position stored in step S4 (S11). Here, the traveling_ECU 22 controls and drives the electric seat motor 32 by the PWS_ECU 26 so as to return the driver seat 40 to the seat position stored in step S4 (initial position).

Figure 4:
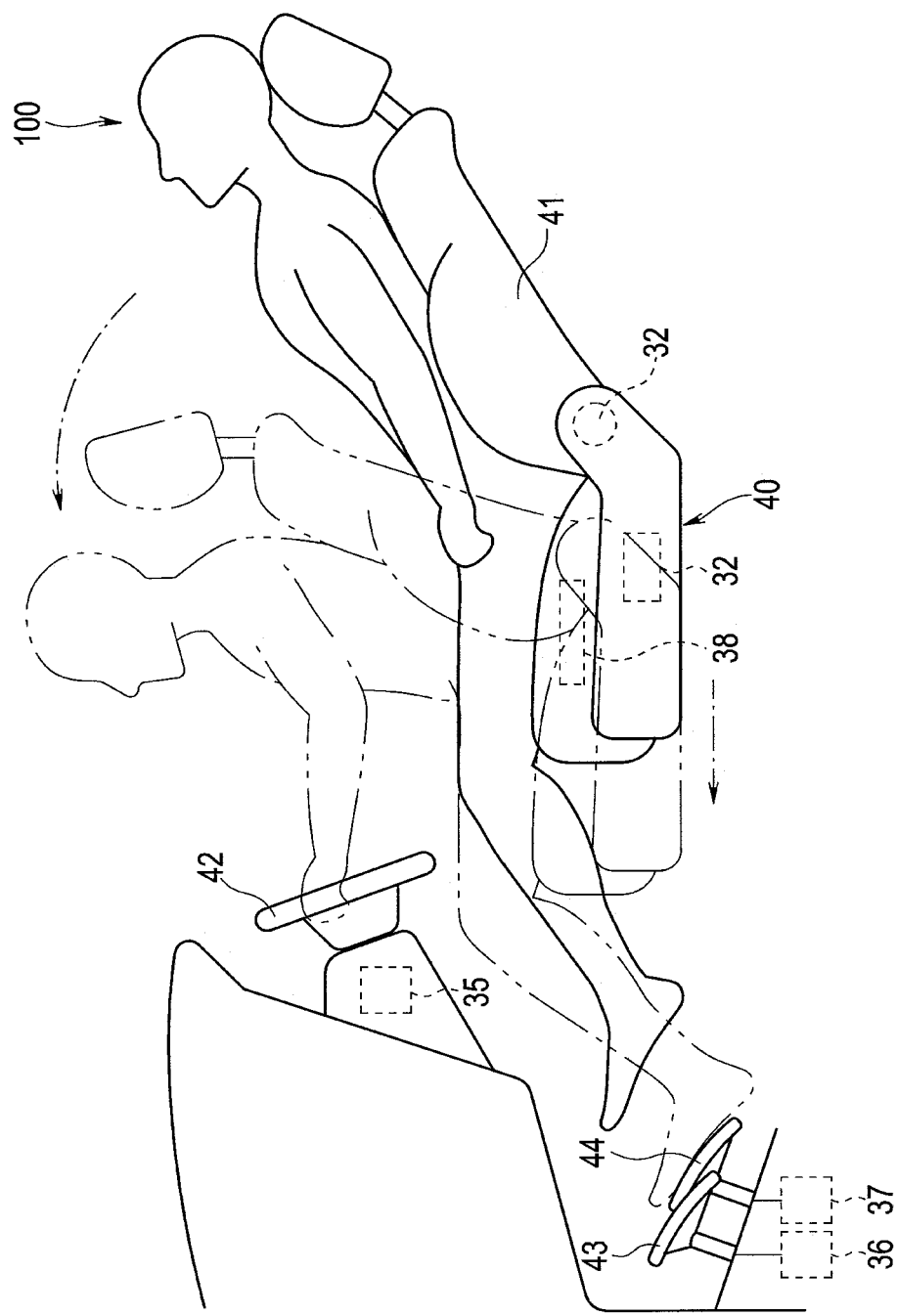
FIG. 4 is a diagram illustrating an example in which a driver has changed a seat position and a backrest angle during automatic driving.

For example, as illustrated in FIG. 4, from a state in which the driver seat 40 is moved backward and the backrest 41 is reclined, the driver seat 40 and the backrest 41 are returned so as to have the predetermined seat position and the posture of the driver 100 during the manual driving as illustrated in FIG. 3.

Next, the traveling_ECU 22 determines whether a detection signal from the steering wheel touch sensor 34 is input (S12). That is, it is judged whether the driver 100 sitting in the driver seat 40, which is returned to the predetermined position, holds the steering wheel 42.

Note that, although the detection by the steering wheel touch sensor 34 is determined here, in addition, it may be possible to comprehensively judge whether the driver 100 is in a state in which manual driving can be performed based on detection signals from the various sensors such as input of the detection signal from the seat sensor 38.

When the driver 100 holds the steering wheel 42, the traveling_ECU 22 judges that the manual driving is possible, ends the control of the automatic driving mode (S13), and returns to step S1 to switch to the manual driving mode.

Note that, even when the driver seat 40 is returned, in a case that the detection signal from the steering wheel touch sensor 34 is not input, such as the driver 100 does not hold the steering wheel 42, the traveling_ECU 22 starts driving control of the evacuation mode (S14).

The driving assist apparatus 1 including the automatic driving control apparatus for the own vehicle according to the embodiment configured as described above is configured so that the second driving assist mode, which is the automatic driving mode, cannot function unless the own vehicle is manually driven the predetermined distance or more. That is, the driving assist apparatus 1 including the automatic driving control apparatus for the own vehicle according to the embodiment prohibits switching to the second driving assist mode, which is the automatic driving mode, among the plurality of driving modes including the manual driving mode, the first driving assist mode, the second driving assist mode, and the evacuation mode, until the own vehicle is manually driven for the set distance or more.

Consequently, the driver 100 can perform only the manual driving even when the driver tries to start the automatic driving mode (second driving assist mode) from the stopped state at a seat position not suitable for the driving operation.

In addition, it is possible to prevent that the driver 100 starts the automatic driving mode from the stopped state, even though the driver 100 cannot satisfactorily perform the manual driving operations such as the steering operation, the accelerator operation, the brake operation, and the like.

Further, even though the driver 100 operates the driver seat 40 such as moving the seat backward and reclining the backrest 41 so as to have a relaxed posture as illustrated in FIG. 4 during the automatic driving mode, the automatic driving mode is switched to the manual driving mode. Alternatively, when the takeover is requested by the system, the driver seat 40 is returned to the seat position and the backrest angle for the manual driving illustrated in FIG. 3 so that the driver 100 has a posture suitable for the manual driving.

Note that the driving assist apparatus 1 including the automatic driving control apparatus for the vehicle may confirms with the driver 100 whether to automatically return the seat and the backrest of the driver seat 40 to the stored seat position and the backrest angle for the manual driving by using a display on an instrument panel or a navigation monitor, a voice, or the like. When the driver 100 approves the return to the predetermined position, the driver seat 40 may be automatically returned to the predetermined position, and when the driver 100 refuses the return to the predetermined position, the automatic driving mode may be continued. Further, it may be periodically confirmed to warn the driver 100, or to execute the automatic driving of the evacuation mode.

Furthermore, in the above description, the traveling_ECU 22 exemplifies a configuration in which when judging the operation by the driver 100 in the manual driving mode, the detection signals from the various sensors are monitored with the set range as the distance. Without being limited thereto, a predetermined traveling time or a predetermined number of times of various operations of the steering wheel 42, brake pedal 43, accelerator pedal 44, and the like in the manual driving mode may be monitored as set range.

According to the above description, the driving assist apparatus 1 including the automatic driving control apparatus for the vehicle may be configured to judge whether the driver 100 can perform an appropriate driving operation, and cause the driver 100 to execute the automatic driving function of the own vehicle.

Note that the driving assist apparatus 1 including the ECUs 22 to 26 includes a processor including a central processing unit (CPU), and storage devices such as a ROM, a RAM, and the like. In addition, all or a part of the plurality of circuits of the processor may be executed by software. For example, the CPU may read and execute various programs corresponding to the respective functions stored in the ROM.

Further, all or part of the functions of the processor may be constituted by a logic circuit or an analog circuit, and the processing of the various programs may be realized by an electronic circuit such as an FPGA.

Respective ECUs 22 to 26 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the respective ECUs 22 to 26 including the throttle actuator 27, the electric power steering motor 28, the brake actuator 29, and the electric seat motor 32. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 1.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The technology described in the above embodiment is not limited to those described above, and various modifications may be made without departing from the gist and scope of the technology. Further, each of the above embodiments includes various stages of the technology, and various technologies may be extracted by appropriate combinations of a plurality of the disclosed constituent elements.

For example, even when some constituent elements are deleted from all the constituent elements illustrated in the respective embodiments, the configuration in which the constituent elements are deleted may be extracted as a technology when the described problem can be solved and the described effect is obtained.

The invention claimed is:

1. An automatic driving control apparatus for a vehicle, the automatic driving control apparatus switching a driving mode of the vehicle between a manual driving mode in which a driver manually performs a driving operation of the vehicle and an automatic driving mode in which the driving operation is automatically performed along a set target traveling route, the automatic driving control apparatus comprising:
a driving mode switching unit configured to monitor a seat position of a seat of the driver while the vehicle travels in the manual driving mode,
wherein the driving mode switching unit stores, before the driving mode switching unit is switched, the seat position of the driver into a memory in response to one of following conditions is met: i) the vehicle has traveled in the manual driving mode for a predetermined distance, ii) a steering wheel of the vehicle has been operated a first predetermined number of times, iii) a brake of the vehicle has been operated a second predetermined number of times, or iv) an accelerator of the vehicle has been operated a third predetermined number of times,
wherein after one of the conditions is met, the driving mode switching unit becomes switchable state to the automatic driving mode, and
wherein, when the seat position is stored in the memory, in response to a driver's operation to switch the driving mode of the vehicle from the manual driving mode to the automatic driving mode, the driving mode switching unit switches the driving mode of the vehicle from the manual driving mode to the automatic driving mode after the seat position is stored in the memory.

2. The automatic driving control apparatus according to claim 1,
wherein, when the driving mode switching unit determines that the seat position of the driver has been changed while the vehicle travels in the automatic driving mode, the driving mode switching unit, upon switching from the automatic driving mode to the manual driving mode, returns the seat to the seat position stored in the memory.

3. The automatic driving control apparatus according to claim 1,
wherein the driving mode switching unit receives various detection signals from a seat sensor configured to detect a seat position of the driver, an accelerator sensor configured to detect an accelerator operation of the accelerator, a brake sensor configured to detect a brake operation of the brake, a touch sensor configured to detect a steering wheel operation on the steering wheel, and a steering torque sensor, and
wherein the driving mode switching unit detects the manual operation by the driver in the manual driving mode.

4. The automatic driving control apparatus according to claim 3,
wherein, when the driving mode switching unit determines that the seat position of the driver has been changed while the vehicle travels in the automatic driving mode, the driving mode switching unit, upon switching from the automatic driving mode to the manual driving mode, returns the seat to the seat position stored in the memory.

5. The automatic driving control apparatus according to claim 3, wherein upon switching from the automatic driving mode to the manual driving mode and when the driving mode switching unit does not receive the detection signal from the touch sensor, the driving mode switching unit executes an evacuation mode for automatically stopping the vehicle in a side strip or the like.

6. The automatic driving control apparatus according to claim 5,
wherein, when the driving mode switching unit determines that the seat position of the driver has been changed while the vehicle travels in the automatic driving mode, the driving mode switching unit, upon switching from the automatic driving mode to the manual driving mode, returns the seat to the seat position stored in the memory.

7. An automatic driving control apparatus for a vehicle, the automatic driving control apparatus that switches a driving mode of the vehicle between a manual driving mode in which a driver manually performs a driving operation of the vehicle and an automatic driving mode in which a driving operation is automatically performed along a set target traveling route, the automatic driving control apparatus comprising:
  circuitry configured to monitor a seat position of a seat of the driver while the vehicle travels in the manual driving mode,
  wherein the circuitry stores, before the driving mode is requested to be switched, the seat position of a seat of the driver into a memory in response to one of following conditions is met: i) the vehicle has traveled in the manual driving mode for a predetermined distance, ii) a steering wheel of the vehicle has been operated a first predetermined number of times, iii) a brake of the vehicle has been operated a second predetermined number of times, or iv) an accelerator of the vehicle has been operated a third predetermined number of times,
  wherein after one of the conditions is met, the circuitry becomes switchable state to the automatic driving mode, and
  wherein, when the seat position is stored in the memory, in response to a driver's operation to switch the driving mode of the vehicle from the manual driving mode to the automatic driving mode, the circuitry switches the driving mode of the vehicle from the manual driving mode to the automatic driving mode after the seat position is stored in the memory.

* * * * *